(12) United States Patent
Kunieda

(10) Patent No.: US 10,946,280 B2
(45) Date of Patent: Mar. 16, 2021

(54) IN-GAME REACTIONS TO INTERRUPTIONS

(71) Applicant: Sony Interactive Entertainment LLC, San Mateo, CA (US)

(72) Inventor: Shunsuke Kunieda, San Francisco, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

(21) Appl. No.: 15/453,125

(22) Filed: Mar. 8, 2017

(65) Prior Publication Data
US 2018/0256979 A1 Sep. 13, 2018

(51) Int. Cl.
| | | |
|---|---|---|
| A63F 13/493 | (2014.01) | |
| A63F 13/5375 | (2014.01) | |
| G06F 3/01 | (2006.01) | |
| A63F 13/31 | (2014.01) | |
| A63F 13/65 | (2014.01) | |

(Continued)

(52) U.S. Cl.
CPC ........ *A63F 13/5375* (2014.09); *A63F 13/217* (2014.09); *A63F 13/31* (2014.09); *A63F 13/47* (2014.09); *A63F 13/493* (2014.09); *A63F 13/65* (2014.09); *G06F 3/011* (2013.01); *G06F 3/013* (2013.01); *A63F 2300/8082* (2013.01); *G02B 27/017* (2013.01)

(58) Field of Classification Search
CPC ......... G06F 3/013; A63F 13/67; A63F 13/493
USPC .............. 463/1, 30–33, 40–42, 46, 47
See application file for complete search history.

(56) References Cited

U.S. PATENT DOCUMENTS

| | | | |
|---|---|---|---|
| 10,512,846 B2 | 12/2019 | Enomoto | |
| 2002/0054117 A1* | 5/2002 | van Dantzich | G06F 3/0482 715/766 |

(Continued)

FOREIGN PATENT DOCUMENTS

| | | |
|---|---|---|
| CN | 110603080 A | 12/2019 |
| WO | WO 2003/012704 | 2/2003 |

(Continued)

OTHER PUBLICATIONS

"Is it acceptable for an AI player to take over a disconnected opponent player's game session in a multiplayer game?"(various posts ), dated Mar. 27, 2016, from https://web.archive.org/web/20160327230529/https://www.reddit.com/r/gamedev/comments/3wi0aj/is_it_acceptable_for_an_ai_player_to_take_over_a/ (Year: 2016).*

(Continued)

*Primary Examiner* — Omkar A Deodhar
*Assistant Examiner* — Ross A Williams
(74) *Attorney, Agent, or Firm* — Polsinelli LLP

(57) ABSTRACT

The present disclosure describes methods and systems directed towards the generation of various in-game reactions based on different types of interruptions that may occur in the real-world. The present invention is able to monitor and detect when the various interruptions in the real-world occur. Based on the type and assigned importance of the interruption, a corresponding in-game reaction can be provided to the user to inform the user of the interruption. Depending on the importance of the real-world interruption, instructions can also be generated for the user device associated with the game. These instructions can allow the user to step away from the game without causing an interruption with other players playing within the same game.

20 Claims, 4 Drawing Sheets

(51) Int. Cl.
*A63F 13/47* (2014.01)
*A63F 13/217* (2014.01)
*G02B 27/01* (2006.01)

(56) References Cited

U.S. PATENT DOCUMENTS

| | | |
|---|---|---|
| 2003/0045360 A1 | 3/2003 | Hora |
| 2006/0154710 A1* | 7/2006 | Serafat ............... A63F 13/10 463/1 |
| 2006/0246973 A1 | 11/2006 | Thomas et al. |
| 2007/0207846 A1 | 9/2007 | Burak et al. |
| 2007/0260567 A1 | 11/2007 | Funge et al. |
| 2008/0045335 A1* | 2/2008 | Garbow ............... A63F 13/12 463/29 |
| 2011/0151953 A1 | 6/2011 | Kim et al. |
| 2014/0364197 A1 | 12/2014 | Osman et al. |
| 2014/0370992 A1* | 12/2014 | Cudak ............... A63F 13/795 463/43 |
| 2015/0186535 A1 | 7/2015 | Patil et al. |
| 2015/0217198 A1 | 8/2015 | Curtis et al. |
| 2015/0363733 A1* | 12/2015 | Brown ............. G06Q 10/06316 705/7.26 |
| 2016/0209658 A1 | 7/2016 | Zalewski |
| 2017/0053440 A1 | 2/2017 | Yoon et al. |
| 2017/0068311 A1* | 3/2017 | Evans ............... G06F 3/011 |
| 2017/0249019 A1 | 8/2017 | Sawyer et al. |
| 2017/0282082 A1* | 10/2017 | Hubbard ............... G06Q 50/00 |
| 2018/0088666 A1* | 3/2018 | Ayoub ............... G06F 3/013 |
| 2018/0256981 A1 | 9/2018 | Enomoto |
| 2020/0061471 A1 | 2/2020 | Enomoto |

FOREIGN PATENT DOCUMENTS

| | | |
|---|---|---|
| WO | WO 2018/165318 | 9/2018 |
| WO | WO 2018/165446 | 9/2018 |

OTHER PUBLICATIONS

Gordon, "How to stop notifications from interrupting your iOS Games" posted, May 10, 2016. https://www.howtogeek.com/253681/how-to-stop-notifications-from-interrupting-your-ios-games/ (Year: 2016).*
PCT/US18/21577, In-Game Reactions to Interruptions, Mar. 8, 2018.
Rabin, Steven; "Game AI Pro: Collected Wisdom of Game AI Professionals", (Year: 2014).
PCT Application No. PCT/US2018/021370 International Search Report and Written Opinion dated May 30, 2018.
U.S. Appl. No. 15/452,443 Office Action dated Jan. 14, 2019.
U.S. Appl. No. 15/452,443 Final Office Action dated Oct. 4, 2018.
U.S. Appl. No. 15/452,443 Office Action dated May 9, 2018.
PCT Application No. PCT/US2018/021577 International Searc Report and Written Opinion dated May 10, 2018.
PCT Application No. PCT/US2018/021370 International Preliminary Report on Patentability dated Sep. 10, 2019; 11 pages.
PCT Application No. PCT/US2018/021577 International Preliminary Report on Patentability dated Sep. 10, 2019; 7 pages.
European Application 18763318.5 Extended European Search Report dated Dec. 17, 2020; 6 pages.

* cited by examiner

IN-GAME REACTIONS TO INTERRUPTIONS

BACKGROUND

Field of Invention

The present invention generally relates to virtual reality gaming. More specifically, the present invention relates to in-game reactions within virtual reality to interruptions that occur in the real-world.

Description of the Related Art

Virtual reality can be an immersive experience within a three-dimensional environment (real or imaginary) for the user. Software and hardware are implemented to generate images, sounds and other sensations corresponding to the three-dimensional environment and a user's presence within that environment. The environment may be displayed using a head-mounted display (HMD) or virtual reality headset. The user may "look around," move, and interact with objects within the environment using corresponding hardware.

To provide a realistic and immersive experience, the software and hardware associated with the virtual reality implementation may generate images, sounds and other sensations associated with the three-dimensional environment that obscures (or completely blocks out) other images, sounds and sensations in the real world. With the effectiveness of immersion into virtual reality, there is a potential problem of obscuring the user's awareness of issues that may arise in the real world. This is a problem since many times users may receive interruptions in the real-world that need attention. Therefore, there is a need to provide reactions within virtual reality games based on interruptions that occur in the real world.

SUMMARY OF THE CLAIMED INVENTION

Embodiments of the present invention include systems and methods for incorporating in-game reactions to interruptions while a user is playing a virtual reality game is presently claimed. The embodiments monitor for one or more external interruptions while the user is playing the virtual reality game, detect when one or more interruptions occur, identify the corresponding in-game reaction that will be used to notify the user that the external interruption occurred, and then finally provide that notification to the user.

DETAILED DESCRIPTION

The present disclosure describes methods and systems directed towards the generation of various in-game reactions (e.g. notifications) based on different types of interruptions that may occur in the real-world. As used herein, an interruption is a real-world event that has occurred. For example, an interruption may include a sound coming from the oven/microwave, a doorbell, or another person near the user. In some cases, the interruption would require the user's attention to address thereby removing the user from the immersive nature of the virtual world. Although various embodiments will be described herein with respect to virtual reality gaming where the user may be fully immersed within a virtual reality world, the present invention may also be applicable to other types of games as well where total immersion is not present. In these cases, an interruption would be real-world events that would draw the user's attention away from the game if the user is made aware of such events.

A variety of different types of interruptions in the real world can be accounted for. For each type of interruption in the real world, a corresponding in-game reaction can be customized to inform the user while the user is within the virtual world. Furthermore, the in-game reaction may be based on user-customized assignment of importance or severity of the interruption in the real-world.

The present invention is able to monitor and detect when the various interruptions in the real-world occur. Based on the type and assigned importance of the interruption, a corresponding in-game reaction can be provided to the user to inform the user of the interruption. Depending on the importance of the real-world interruption, instructions can also be generated for the user device associated with the game. These instructions can allow the user to step away from the game without causing an interruption with other players playing within the same game (i.e. multi-player game).

Figure 1:
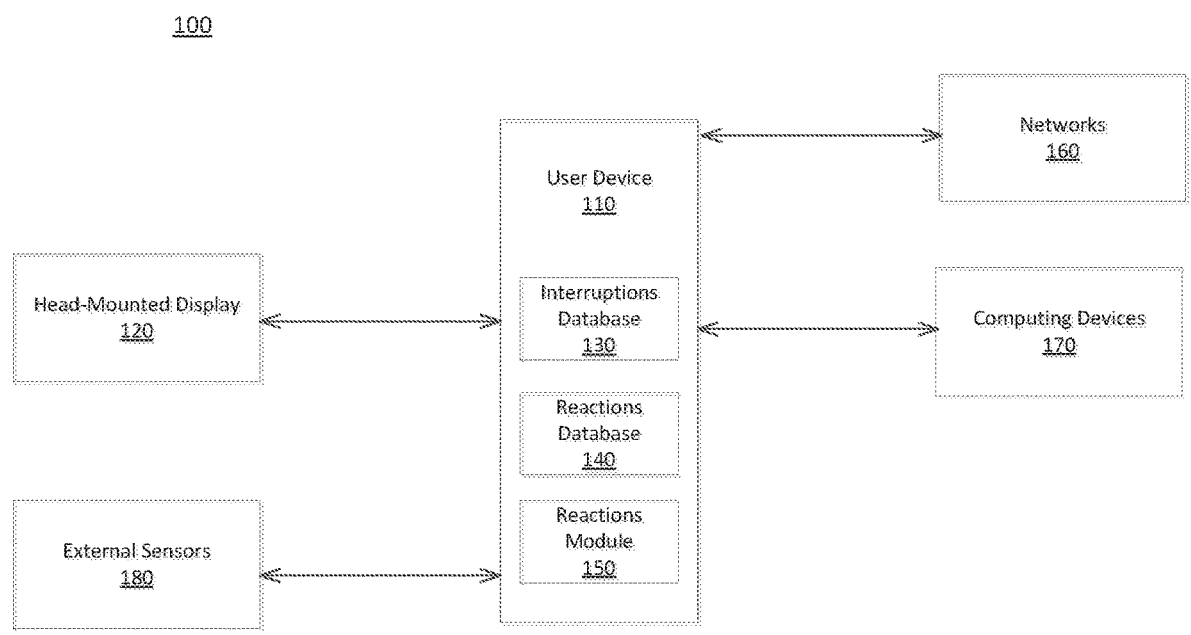
FIG. 1 is an exemplary system for implementing in-game reactions to interruptions.

FIG. 1 is an exemplary system 100 for implementing in-game reactions to interruptions. The system 100 includes a user device 110 that is used to facilitate user participation within the virtual world. The virtual world may be generated by the user device 110. In some embodiments, the user device 110 may communicate with the internet/cloud to connect to a server that hosts the virtual world. A corresponding head mounted display (HMD) 120 may be used to facilitate immersing a user within the virtual world. The system 100 may also include various other networks, devices, and sensors 130-150 communicatively connected to the user device 110. The networks, devices, and sensors 130-150 may provide interruptions to the user device 110 that the user may need to be informed about. Further details regarding each of the elements of the system 100 will be provided below.

As described above, the user device 110 may be used to facilitate user participation within the virtual world. In some situations, the user device 110 may also generate the virtual world for the user to become immersed in. The user device 110 includes hardware and/or software that generate images, sounds and other sensations (i.e. vibration) in order to produce a three-dimensional virtual environment.

The user device 110 may also simulate the user's presence within that environment. For example, the user device 110 would include hardware and/or software (e.g. head mounted display 120) that facilitates the user "looking around," moving, and/or interacting with objects within the environment. Further details regarding the elements of the user device 110 will be provided below with respect to FIG. 2.

The head mounted display (HMD) 120 may be used to immerse the user within the three-dimensional virtual environment. Also referred to as a virtual reality headset, the HMD 120 may include head-mounted goggles with a screen in front of the eyes used to display the images of the environment. The screen may be made opaque so as to obscure the user's vision of the real world thereby providing a more immersive experience for the user. The HMD 120 may also include speakers or headphones that provide related audio associated with the environment. With the use of both the screen and the speakers/headphones, the HMD 120 can completely obscure the user's perception of the real world so that the user is able to concentrate in the virtual world.

It should be noted that although the screen may be opaque when the user is participating in the virtual environment, there may be embodiments where the user is able to instruct the screen to become transparent. However, it may be possible to instruct the screen to become transparent so that the user is able to view the real world as needed. For example, the user may want to see where he/she is currently standing if the virtual reality game requires some movement. The transparency would allow the user to re-position as needed so that no contact is made to surrounding objects or people.

Returning to the user device 110, the user device 110 may include various databases and modules to carry out the in-game reactions to various real-world interruptions. As illustrated in FIG. 1, the user device 110 may include an interruptions database 130, reactions database 140, and a reactions module 150. The interruptions database 130 would include information about each real-world interruption that the user would like to be notified with in-game reactions. The reactions database 140 would include instructions covering different methods of how information about the real-world interruptions would be provided to the user while within the virtual game. The reactions module 150 would include instructions for carrying out the various methods of informing the user about the real-world interruptions. Further details regarding each of the databases and modules 130-150 included in the user device 110 are provided below.

As noted above, the interruptions database 130 includes information about each associated real-world interruption that has been identified by the user to be detected. The user would be able to utilize a graphical user interface (GUI) (not shown) to identify interruptions associated with various networks, other computing devices and/or sensors 160-180. The GUI may be associated with the user device 110, the HMD 120, or with other devices that may be communicatively connected to the user device 110 such as a mobile device with an application (not shown).

Using the GUI, the user is able to identify various real-world interruptions that the user would like to be made aware of when they occur while participating within the virtual game. Exemplary interruptions that can be identified may include interruptions coming from appliances (e.g. microwave, oven) and other devices (e.g. security system, door bell, garage) connected to a network (i.e. smart-home network). Emails, texts, voicemail, phone calls, and video from various devices (e.g. mobile devices, laptop, desktop) may also be identified as interruptions that the user would like to be notified about at the user device 110. Furthermore, the user device 110 and/or HMD 120 may include sensors that can be used to detect nearby people. The detection of nearby users may include those who may want to interact (i.e. talk) with the user while the user is within the virtual world. Alternatively, the detection of nearby users may be used to ensure that the user does not accidentally bump into others while playing the virtual game.

As described above, the system 100 may include a home network (i.e. smart home) that is communicatively connected to the user device 110. The home network may be connected to different home appliances (e.g. oven, microwave) that can be programmed to output interruptions based on pre-determined criteria. For example, the oven may be programmed to output a sound for the user to hear or a notification (i.e. interruption) to the home network when the oven has pre-warmed to a pre-determined temperature. In another scenario, the oven may provide another type of sound or notification (i.e. interruption) if the food has been baked/cooked for a pre-determined period of time. The user, who is immersed within the virtual world, may lose track of the oven and time. Therefore, interruption coming from the oven may be identified by the user as being a type of interruption that an in-game reaction should be generated for to ensure that the food is cooked properly.

Other appliances and devices associated with the home network can also be identified by the user using the user device 110. As known in the art, various other smart-home related appliances and devices (e.g. lighting, thermostat, door/locks, security cameras, garage, microwaves) can be customized to operate in a pre-determined manner which includes outputting some form of interruption for the user via the home network. For example, a person may be at the door and ring the doorbell. The signal from the doorbell may create an interruption that is sent to the network used to notify that someone is at the door. Furthermore, a security camera by the door may take a photo or video of the person. The doorbell interruption and photo/video of the person may be provided in-game to the user to inform the user that someone is at the door. Furthermore, the identity of the person at the door can be provided to the user in the same way in-game.

By having the home network connected to the user device 110, these interruptions can be identified by the user and selected to have corresponding in-game reactions generated. The user can subsequently be notified within the virtual world when one or more of these identified interruptions associated with the smart-home related appliances and devices are detected. Although the real-world interruption may be obscured from the user's perception while the user is immersed in the virtual world, the in-game reactions can be used to notify the user within the virtual world.

The user may also assign different levels of importance to various interruptions identified above. The assignment can be performed using the same GUI associated with the user device 110. The level of importance may influence, for example, how often in-game reactions (e.g. notifications) within the virtual world are provided to the user. Alternatively, the importance may also influence how prominent the in-game reactions within the virtual world may be provided (e.g. bigger font). Through the use of an assigned importance level, the more important interruptions can be handled with corresponding reactions so that the user does not miss out on a particular interruption when it occurs in the real-world.

The assignment of the levels of importance may have default conditions on how corresponding interruptions of a particular importance level are presented to the user within the virtual world using in-game reactions. As noted above, the higher the importance assigned to a particular interruption, the more important it may be to the user device 110s to ensure that the user is made aware of the interruption when it is detected. This may involve presenting the reactions in ways that are more prominent. For example, such ways include bigger text, more frequent notifications, notification in a centralized area, and the use of audio.

The way that the user device 110 handles the importance level of different interruptions can be customized by the user. The user may wish to customize how in-game reactions are presented based on importance level (i.e. all very important interruptions would be handled the same way) using the GUI associated with the user device 110. Furthermore, the user may wish to customize how in-game reactions are presented for each interruption on a case-by-case basis.

For example, the user may indicate that cooking food using the oven is of high importance since the user would like to avoid burning the food. Meanwhile, incoming emails or texts associated with the user's mobile device may have lower importance unless they are work related. When the oven provides an interruption indicating that the food is done cooking, the in-game reaction may be presented more frequently and in larger text to ensure that the user is aware that the food in the oven is done. In contrast, interruptions associated with the emails or texts, may be provided using smaller text and text that disappears after a pre-determined period of time.

Even within each type of interruption, the user may be able to distinguish different types of interruptions that have higher importance than others. For example, the user may characterize types of emails and/or texts and corresponding importance levels. An evaluation of the subject matter of the emails or texts can be performed by the user device 110 in order to associate the email or text with the corresponding importance level. For example, if the email or text is not work-related, it would be determined to be less significant. The in-game reaction may be used to notify the user about the presence of the email or text in a smaller text initially and removed from the view of the user after a pre-determined amount of time. However, if the email or text is work related, the in-game reaction may provide the presence of the email or text using larger text and leave the reaction visible in the user's view until the user has "read" the email or text (i.e. the email or text has been identified as being read or opened by the user).

The reactions database 140 would include information regarding the different ways the user device 110 can notify the user about detected real-world interruptions while the user is within the virtual world. For example, the reactions database 140 may dictate where in a field of view of the virtual game the in-game reactions may be provided. For example, the in-game reactions may be provided in a central area of the user's field of view or via side panels/peripheral area corresponding to the user's field of vision.

Selection of a location can be used based on importance of the interruption. For example, lesser important interruptions can be provided as in-game reactions in side panels and/or peripheral field of vision of the user. Such locations may be provided so as not to distract the user from the game but allowing the user to view the notifications as needed. In contrast, more important interruptions may be displayed as text-based notifications in a centralized area of the user's vision. These interruptions may be more important and the user may need to be made aware as soon as the interruption has occurred.

It should be noted that other ways of providing the in-game reactions are possible. For example, the reactions may be provided via a scrolling title bar across the top of the user's field of vision. Alternatively, all notifications can be associated with a drop down menu. The drop down menu may be associated with an indicator that indicates how many in-game reactions are currently available for the user to view. The drop down menu may also distinguish between unread in-game reactions, read in-game reactions that correspond to interruptions that have yet to have been resolved, and previous read in-game reactions that correspond to interruptions that have been resolved.

Other types of reactions included in the database 140 may include generating instructions to adjust the sound or display of the user device 110 and/or HMD 120. For example, if an interruption is a voicemail message, a corresponding in-game reaction may be to reduce the sound of the virtual world so that the user can listen to the voicemail message. Alternatively, if the interruption is a nearby person wanting to talk to the user while the user is immersed in the virtual world, corresponding in-game reactions may reduce the sound of the virtual world so that the user can listen to the person as well as modify the opaqueness/transparency of the display for the HMD 120 so that the user is able to view the person without taking off the HMD 120.

The various reactions (i.e. notifications) stored in the reaction database 140 are associated with the different detected real-world interruptions. As described above, the user may utilize a GUI to identify which interruptions from various networks, devices and/or sensors should be forwarded to the user (at the user device 110) while the user is within the virtual world.

Furthermore, the user is also able to determine what reactions (i.e. notifications) may be usable with each identified interruption. For example, the user may wish to have all interruptions from the oven displayed as a text-based notification within the virtual world. The text-based notification can be used to indicate when the oven is done pre-heating or if the food is done cooking. Alternatively, the user may wish to have the same interruptions merely represented within the virtual world as a simple sound (e.g. bell). The sound can be used to signal that the oven is done pre-heating or if the food is done cooking.

Different reactions can also be used based on the virtual world (or type of virtual reality game) the user is participating in. There may be many different types of virtual reality games that the user can participate. Based on the type of game, different types of reactions may be used. Furthermore, similar reactions used in both games can be implemented differently. For example, if the user is playing a driving simulation, reactions may be implemented in a number of places corresponding to the dashboard or rearview mirror. These areas are still within the user's field of view but would not interfere with gameplay. However, if the user is playing a basketball or first person shooter (FPS) simulation, the in-game reactions would need to be implemented in a different manner since the areas for displaying the reactions will be different from the driving simulation. For example, with the sports or FPS simulation, reactions may be provided in transparent boxes away from a central area of view so as to not interfere with gameplay. However such boxes would still be in view from the user and can be adjusted based on what is occurring within the simulation.

As described above, the user is able to customize how interruptions are presented as in-game reactions (e.g notifications) within the virtual world using a GUI associated with the user device 110. In some situations, the in-game reactions may have a default setting for each type of interruption. For example, interruptions coming from the user's mobile phone (e.g. emails, texts) may be provided as text-based notifications by default while voicemails can be provided to the user within the virtual world as an audio clip.

Lastly, the reactions module 150 carries out the notification for the user within the virtual environment regarding any detected interruption using the associated reactions stored in the reactions database 140. The reactions module 150 would facilitate user customization and assignment of in-game reactions to detected interruptions. In some embodiments, such customization and assignment of reactions is performed through a graphical user interface (GUI) associated with the user device 110. For example, the GUI may be displayed via the user device 110 whereby the user may provide various inputs identifying which interruptions should be detected and what reactions should be associated with each interruption. An example GUI is provided below with respect to FIG. 3.

As noted above, the GUI may be associated with the HMD 120 or an application on a mobile device that is communicatively connected to the user device 110. The HMD 120 or mobile device (not shown) may receive user customization regarding how in-game reactions should be carried out based on interruptions received by the user device 110. The user customization can then be transmitted to the user device 110 and provided to the reactions module 150 for use.

It should be noted that although the present disclosure is related to providing in-game reactions to real-world interruptions associated with virtual reality, the teachings may also be applied to other types of games as well not related to virtual reality. In fact, other games may utilize the in-game reactions to real-world interruptions to similarly notify the user of any significant real-world events that occur while the user is playing the game nevertheless.

The various other networks, other computing devices and sensors 160-180 may be each communicatively connected to the user device 110. These networks, devices and sensors 160-180 may produce a variety of different interruptions external from the virtual world that the user may need to be made aware of.

An example network 160 may include a home network (i.e. smart home). The home network may be communicatively connected to various devices or appliances present within the home of the user including doors/locks, security systems (i.e. cameras, motion sensors), alarms (i.e. smoke, carbon-monoxide), microwaves, ovens, thermostat, and garage.

As described above, each device or appliance connected to the network 160 may produce an interruption based on real-world events that the user should be made aware of. For example, security systems may be able to detect people at the door using various motion sensors and/or cameras, a door/lock may detect when a person enters the house, and Microwaves/ovens may be provided a pre-determined period of time to cook food. Each interruption may have a unique real-world form of notification. But since the user is within the virtual world, these real-world interruptions may be missed. Therefore, a corresponding data is provided from each of the devices and/or appliances to the user device 110 (via the network 160) to be used for in-game reactions notifying the user of the real-world interruption occurrences.

Aside from networks 160 that can be communicatively connected to the user device 110, individual computing devices 170 may also directly be connected to the user device 110 to provide interruptions for the user to be made aware of within the virtual world. Exemplary computing devices 170 may include a mobile device, laptop, desktop, or tablet. There may be one or more computing devices 170 connected to the user device 110. In situations where there are two or more computing devices 170, each of the computing devices 170 may form their own network. The network can then forward interruptions from each of the computing devices 170 to the user device 110 via, for example, Wi-Fi, Bluetooth, or the Internet.

Each of the computing devices 170 may be the source of many interruptions that the user would like to be made aware of. For example, the computing device 170 may receive incoming text, emails, phone calls, and videos of various subject matter and importance. As each of the texts, emails, phone calls and/or videos are received by computing devices 170, the user may wish to be informed when each are received and the subject matter of each.

The computing devices 170 can each provide interruptions to the user device 110 regarding when each of the texts, emails, phone calls and/or videos have been received at the computing device 170. The reactions module 150 can then generate in-game reactions to notify the user that a text, email, phone call and/or video has been received at a particular computing device 170. The in-game reaction provided to the user on the user device 110 may correspond to customized criteria regarding importance of text, email, phone call and/or videos in general. The user may also provide customized criteria regarding importance of text, email, phone call and/or videos coming from one computing device as opposed to others.

Furthermore, in some embodiments, the computing devices 170 can also provide to the user devices 110 the received text, emails, phone calls and/or video. The user device 110 may be capable of evaluating the received text, email, phone call and/or video (via the reactions module 150) to further characterize a subject matter of the text, email, phone call and/or video. The evaluated subject matter can subsequently be used to characterize the importance of the text, email, phone call and/or video. This evaluation is used to generate corresponding in-game reactions (i.e. how the in-game reaction is displayed and where) based on the characterized importance.

The computing devices 170 may also include various applications associated with schedules and/or calendars. Whenever a scheduled event occurs (or is about to occur a pre-determined period of time later), the application may provide a notification to the user corresponding to the event. For example, if the user has an appointment at noon, a calendar application may provide an audio notification at 11 am, 11:55 am and at noon associated with the appointment.

Corresponding to the audio notification, the computing device 170 may provide this interruption to the user device 110 so that the user can be made aware of the upcoming appointment. The in-game reaction can be provided to the user within the virtual world based on the importance of the important. Furthermore, the in-game reaction provided to the user within the virtual world can also correspond to an elevated importance level as the time for the appointment draws near. For example, in-game reactions that are in the peripheral of the user's vision can be provided initially when the appointment is an hour away. However, as it becomes closer to the time for the appointment, the in-game reactions may be made more prominent so as to ensure that the user is aware that the appointment is about to begin.

As illustrated in FIG. 1, there may be various sensors 180 that provide information to the user device 110 that can be the cause of one or more interruptions that the user should be made aware of within the virtual world. In an embodiment, there may be sensors 180 associated with the user, for example via the HMD 120. These sensors 180 may be used to monitor the general vicinity of the user. The monitoring can generate interruptions used to generate in-game reactions so that the user is made aware whether the user is near another person or object. Since the user's vision may be obscured by the HMD 120, the sensors 180 can be used to prevent the user from coming into contact with surrounding objects or people/inform the user of their surroundings.

Furthermore, the sensors 180 may also be used to detect whether nearby people would like to get the user's attention within the game. The sensors 180 (i.e. microphone) may be capable of detecting the user's name or voices that can be indicative of other people wanting to converse with the user while the user is within the virtual world. In response to detecting that someone would like to talk to the user, corresponding in-game reactions (i.e. notification) can be provided to the user so that they are made aware that someone outside of the game would like to speak to them. Furthermore, there may be embodiments which may modify the sound coming from the HMD 120 so that the user can hear what is being spoken to the user. Additionally, the embodiments can incorporate modifications to the transparency or opaqueness of the HMD 120 display so that the user can view the individuals which would like to speak to the user.

The elements of the system 100 illustrated in FIG. 1, as described above, would be used to detect when real-world interruptions occur and subsequently generate in-game reactions so that the user playing in the virtual world can be made aware of the real-world interruption. However, there may be some real-world interruptions that would require the user's attention. For example, if there is food has just finished cooking in the oven or if an individual is at the door, the user would presumably need to step away from the user device 110 for a period of time in order to address the real-world interruption.

Based on the type of game being played by the user, corresponding instructions from the reactions database can also be implemented via the reaction module 150 that would allow the user to step away from the user device 110 to address the real-world interruption. For example, if the user is participating in a single-player game, instructions may include initiating a pause in the progress of the game so that the user can leave the user device 110. For more important interruptions, the user device 110 may be instructed to automatically save the progress of the game and pause/end the current play session to allow the user to step away from the user device 110.

However, if the user is participating in a multi-player game, saving the progress of the game and/or pausing the game would not allow the user to step away without negatively affecting the game experience for other users participating within the same multi-player game. In games where the players are all divided into teams, having a user who is "AFK" (i.e. away from the keyboard) can create a disadvantage for that corresponding team. Therefore, these multi-player games, the reactions database 140 may include instructions used to "take over" for the user for a period of time while the user is away addressing the real-world interruption. For example, an artificial intelligence (AI) may be initiated to take the user's place. The AI may utilize default tactics or gameplay behavior. In some embodiments, the user may customize how the AI will behave. In other embodiments, the reactions module 150 may analyze the user's playstyle and provide an AI to control the user's player that corresponds to the user's playstyle while the user is away from the user device 110.

Alternatively, other ways of ensuring that other users are not severely impacted from the user being AFK to address the real-world interruption can also be implemented. For example, a replacement player can be searched for and provided to replace the user within the multi-player game. Alternatively, handicaps can be implemented (i.e. bonuses for the team with the AFK user) so that the teams can be more balanced despite the user being away from the user device 110. The user's in-game character can also be relocated to a temporary location, made invulnerable, or temporarily removed from the game so as to not interfere with the gameplay of the other players participating within the multi-player game.

Figure 2:
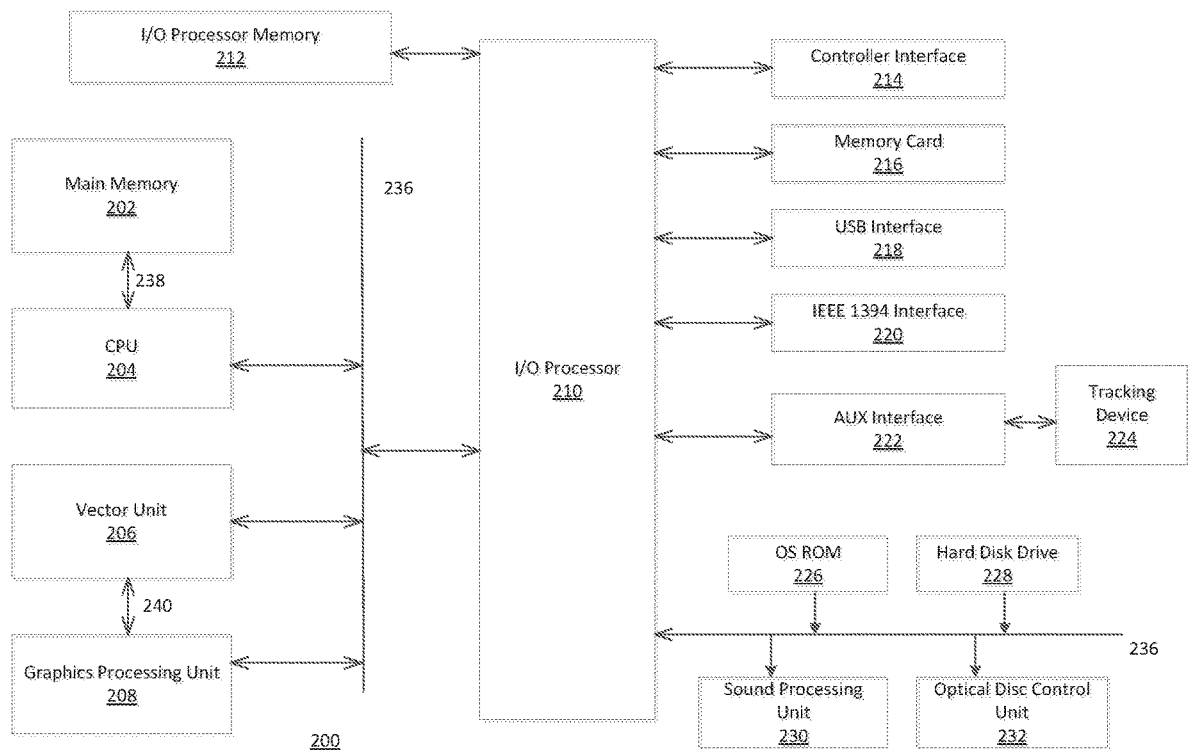
FIG. 2 is an exemplary user device.

FIG. 2 is an exemplary user device (i.e. client device as illustrated in FIG. 1) 200. The exemplary user device 200 (e.g., desktop, laptop, tablet, mobile device, console gaming system) is a device that the user can utilize to facilitate carrying out features of the present invention pertaining to interactions with the cut-scene gameplay.

The user device 200 may include various elements as illustrated in FIG. 2. It should be noted that the elements are exemplary and that other embodiments may incorporate more or less than the elements illustrated. With reference to FIG. 2, the user device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The user device 200 further includes an operating system read-only memory (OS ROM) 226, a sound processing unit 228, an optical disc control unit 230, and a hard disc drive 232, which are connected via a bus 234 to the I/O processor 210. The user device 200 further includes at least one tracking device 224.

The tracking device 224 may be a camera, which includes eye-tracking capabilities. The camera may be integrated into or attached as a peripheral device to user device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user device 200 that captures voice data. The microphone may conduct acoustic source localization and/or ambient noise suppression.

Alternatively, tracking device 224 may be the controller of the user device 200. The controller may use a combination of built-in accelerometers and infrared detection to sense its position in 3D space when pointed at the LEDs in a sensor nearby, attached to, or integrated into the console of the entertainment system. This design allows users to control functionalities of the user device 200 with physical gestures as well as button-presses. The controller connects to the user device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 200 may be an electronic gaming console. Alternatively, the user device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user device 200 provides instructions via the controller interface 214 to the CPU 204. For example, the user may instruct the CPU 204 to store certain information on the memory card 216 or instruct the user device 200 to perform some specified action.

Other devices may be connected to the user device 200 via the USB interface 218, the IEEE 1394 interface 220, and the AUX interface 222. Specifically, a tracking device 224, including a camera or a sensor may be connected to the user device having the first party portal 200 via the AUX interface 222, while a controller may be connected via the USB interface 218.

Figure 3:
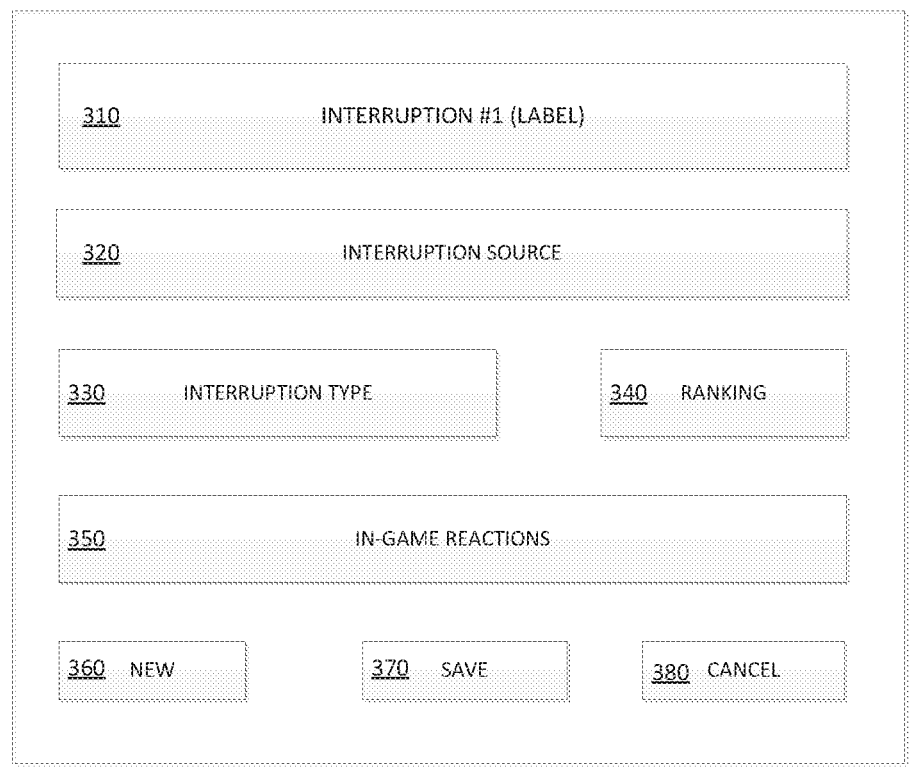
FIG. 3 is an exemplary graphical user interface for customizing in-game reactions to interruptions.

FIG. 3 is an exemplary graphical user interface (GUI) 300 for customizing in-game reactions to interruptions. As noted above, the user is able to identify various real-world interruptions and have those interruptions be provided as in-game reactions (i.e. notifications) through the use of the GUI 300. In this way, the user remains aware of what happens in the real-world despite being immersed within the virtual world. The GUI 300 also allows the user to classify various interruptions based on importance and dictate how certain interruptions are provided as in-game reactions.

In some embodiments, the GUI 300 is displayed on a screen of a user device. The user is then able to interact with the GUI 300 through the user device (e.g. mouse, keyboard, touchscreen). As illustrated in the figure, the GUI 300 may include various different elements that the user can interact with in order to customize what interruptions are provided as in-game reactions. These elements include a label box 310, interruption source 320, interruption type 330, ranking of the significance of the interruption 340, and selection of a corresponding response 350. The user is also able to create new entries 360 as needed. Furthermore, the user is able to save 370 or cancel 380 each entry as needed. Further details regarding each of the elements 310-380 identified in the GUI 300 will be provided below.

Element 310 corresponds to an interruption label. The interruption label can be customized by the user in order to identify what interruption will be monitored for and what corresponding in-game reaction will be provided. There may be instances where there may be similar interruptions that can be monitored for. For example, the user may receive emails, texts, phone calls or video from a plurality of different computing devices (e.g. mobile phones, laptops). In this way, the user would be able to identify and distinguish interruptions coming from a mobile phone from a laptop.

Furthermore, the interruption labels can be used by the user to search for previous interruption/in-game reaction customization entries created. Since all the customization information is stored on the user device (via the interruption database), the user may be allowed to search for previous entries using a search engine associated with the user device. The user may search based on the provided labels. In this way, the user can pull up previously stored customization entries based on the labels more easily in order to view and/or modify these customization entries.

Element 320 corresponds to the interruption source. The user is able to identify the source of where the interruption will be coming from. The user device may include a list of networks, devices and/or sensors that are currently communicatively connected to the user device. In other embodiments, the user may poll for/search for nearby networks, devices and/or sensors and add them to the user device. Once selected, the user device can be instructed to poll for information coming from that selected source. Information coming from other non-selected sources concerning real-world interruptions can be ignored. Alternatively, non-selected interruption sources can be provided a default lower importance level in terms of what in-game reaction would be generated for the user.

Element 330 corresponds to the type of interruption that may come from the selected interruption source. The type of interruption may correspond to various pre-determined interruptions that the user device may recognize from a particular source. For example, an oven may include various pre-established types of interruptions to indicate when the oven has been pre-heated properly or when the food in the oven is done cooking. In another example, a mobile device may include various interruptions for different instances such as email, text, voicemail, video, alarms, and schedule/calendar events.

The user is able to select a particular interruption to monitor for using element 330 coming from the selected source selected from element 320. It may be possible that if no interruption type was selected that a default condition would include monitoring for any/all interruption coming from the selected source from element 320.

Element 340 allows the user to assign a rank or level of importance to interruptions coming from the selected interruption source. The rank or level of importance can be set from 1 (not important at all) to 5 (important) to 10 (emergency). It should be noted that different ranges and values in how to characterize importance/rank can be implemented in other embodiments.

As indicated above, the importance level can correspond to how an in-game reaction is displayed for the user within the virtual world. Although a default level of importance can be established for all interruptions, the user is able to set varying importance levels for interruption sources and/or interruptions coming from each interruption source.

As described above, the user is able to provide importance levels for interruptions coming from various sources. For example, the user is able to assign a higher importance for all interruptions coming from the oven compared to interruptions coming from the user's laptop. Furthermore, the user is able to provide importance levels for each interruption coming from the same source. For example, the user may be able to assign a higher importance for phone call interruptions coming from the user's mobile phone compared to interruptions corresponding to texts or emails coming from the user's mobile phone.

In further embodiments, the user may even customize within each type of interruption the importance level of the interruption. As described above, the user may establish an importance level for all incoming emails coming from the user's mobile phone. However, the user may also dictate that all work-related email can be provided an even higher importance level. The user device can evaluate the subject matter of the received emails as they come in, for example, by evaluating the sender's address, header or content of the email. Based on the evaluation, the user device can make a determination as to whether the received email corresponds to work-related email.

Element 350 corresponds to in-game reactions that can be selected to inform the user regarding interruptions coming from the selected source or interruption type. The in-game reactions can be provided via a drop-down menu that corresponds to all available methods store in the reactions database. These in-game reactions can correspond to instructions regarding how the information about the interruptions should be provided to the user within the virtual world. As described above, such information may be provided via text-boxes or video. Furthermore, the location of the text-boxes or the video can be controlled as well.

These in-game reactions may also correspond to instructions that are provided to the user device to facilitate the user in stepping away for a period of time to resolve the real-world interruption. As described above, some exemplary instructions may include initiating a pause of the current progress of the game or implement an AI-controlled character to take over for the user while the user is away from the user device.

The user may select one or more in-game reactions that can be implemented for the particular selected interruption source or interruption type. In some embodiments, default in-game reactions can already be assigned. The default in-game reaction used can be based a combination of the selected interruption source, interruption type or rank/importance of the interruption.

Element 360 corresponds to the "new" function that allows the user to create new customization associations between interruptions and in-game reaction described above. With each new entry, the user is able to customize what interruption can be detected and how the interruption is handled while the user is within the virtual world (i.e. in-game reaction).

In some embodiments, once a particular interruption type has been selected, each "new" entry may prevent the user from re-selecting that same combination of interruption source and interruption type. This may be used to prevent duplicate entries associated with the same interruption type coming from the interruption source. Rather, the previous entry stored on the user device (in the interruption database) may be retrieved.

Element 370 corresponds to the "save" function that allows the user to save customization associations between the interruptions and in-game reaction described above. The user customization for the interruptions is stored on the user device in the interruption database. The user customizations may be stored based on the interruption source, interruption type and rank/importance.

Lastly, element 380 corresponds to the "cancel" function that allows the user to discard a current customization association that the user would not like to save. It should be noted that other options may also be implemented with the GUI 300 not described above in further embodiments. For example, a user may be able to identify a time period where certain interruptions from a particular interruption source can be provided as in-game reactions to the user in the virtual world. Alternatively, the user can identify a time period where certain interruptions can be blocked (not sent to the user device). In this way, the user can control when in-game reactions can be provided to the user within the game. For example, the user may wish to play uninterrupted during a first period of time (i.e. 10-11 am). After the first period of time, the user may begin receiving in-game reactions from various sources.

Figure 4:
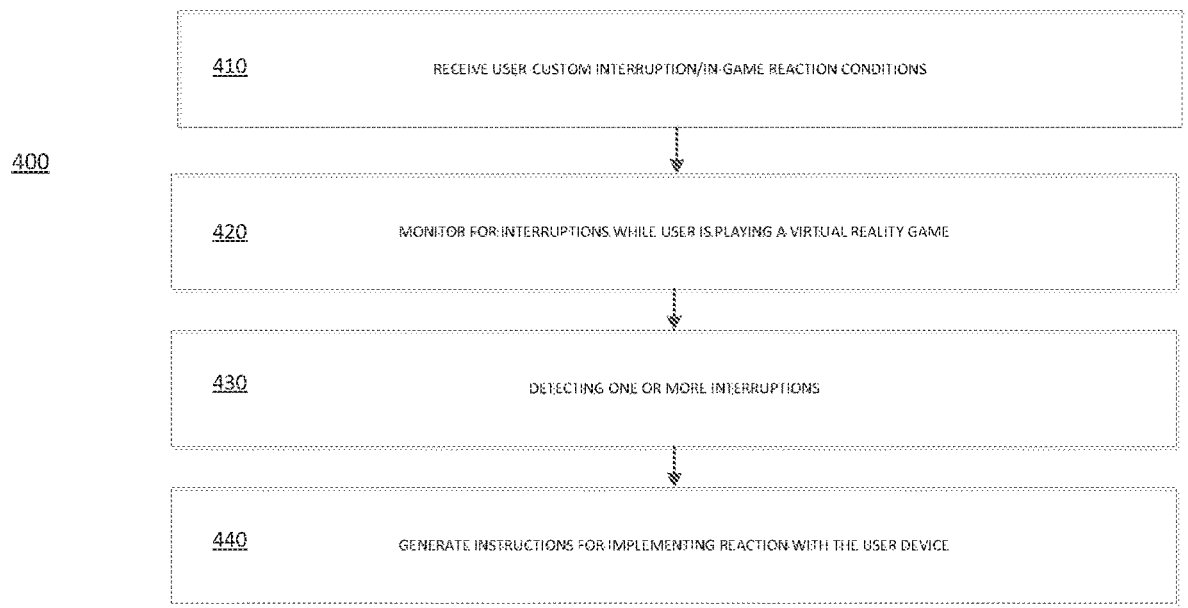
FIG. 4 is a method for carrying out the in-game reactions to interruptions.

FIG. 4 is a method 400 for carrying out the in-game reactions to interruptions. The user device may poll for interruptions coming from various sources. Once an interruption is detected, a corresponding in-game reaction is generated for the user. The in-game reaction that is generated may be based on stored criteria that was previously entered by the user.

In step 410, the user establishes various interruption and in-game reaction conditions to be implemented by the user device. The user is able to select interruptions that should be monitored for by the user device. The user is also able to customize how interruptions should be handled while the user is within the virtual world. As described above, these interruptions can be handled based on an assigned importance level.

In step 420, the user device will poll for/monitor for interruptions while the user is participating within the virtual world. The user device may be communicatively connected to various networks, computing devices and sensors.

In step 430, the user device detects at least one real-world interruption. The interruption may be associated with a selected interruption source identified in the user customization. As noted above, the interruption may also be detected from a non-selected interruption source. Although not selected, the non-selected source can choose to transmit interruptions to the user device. Alternatively, the user device would be able to detect interruptions coming from the non-selected source.

Once an interruption has been detected, corresponding in-game reactions are generated in step 440. The interruptions may be based on user-customized conditions implemented in step 410. As noted above, these user-customized conditions may be stored on the user device in the interruption database. The user device (via the reaction module) may search the interruption database for the corresponding user-customized condition associated with the detected interruption. In scenarios where no user-customized conditions are available, a default condition may be used instead.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for incorporating in-game reactions within virtual reality games, the method comprising:
    establishing a current game session between a virtual reality device and a game server that hosts a virtual reality game, wherein establishing the current game session is based on communicatively connecting the virtual reality device to the game server via a communication network;
    monitoring for interruptions from one or more sources external to the virtual reality game during the current game session during which a user is playing the virtual reality game on the virtual reality device;
    detecting at least one interruption to user gameplay within the current game session; and
    executing instructions stored in memory, the instructions being executed by a processor to:
        notify the user of the detected interruption;
        initiate a predefined in-game reaction within the current game session of the virtual reality game that corresponds to the detected interruption, wherein the predefined in-game reaction is executed for an identified period of time during which the user is away from the current game session of the virtual reality game responsive to the notification of the detected interruption, wherein execution of the predefined in-game reaction includes initiating an artificial intelligent control of an in-game character of the user based on a previously received user customization regarding the artificial intelligent control of the in-game character of the user in continuation of the current game session during the identified period of time; and
        allow the user to resume gameplay within the current game session of the virtual reality game, wherein the artificial intelligent control of the in-game character ceases when the user resumes gameplay after the identified period of time.

2. The method of claim 1, further comprising defining the in-game reaction by:
    receiving the user customization regarding a type of the at least one interruption, wherein the received user customization specifies that the in-game reaction is to be initiated when the type of the at least one interruption is detected, and
    storing the user customization regarding the type of at least one interruption in memory, wherein initiating the in-game reaction is based on the stored user customization regarding the type of at least one interruption.

3. The method of claim 2, wherein the user customization further specifies a level of importance of the type of the at least one interruptions, and wherein the specified level of importance is stored in association with the predefined in-game reaction to the type of the at least one interruption.

4. The method of claim 3, wherein notifying the user is based on the specified level of importance of the type of the at least one interruption, and further comprising increasing a prominence of the notification based on an increase in the specified level of importance.

5. The method of claim 4, wherein the at least one interruption includes a calendar appointment, and further comprising increasing the specified level of importance as the calendar appointment approaches.

6. The method of claim 4, wherein the notification is visual, and wherein increasing the prominence of the notification comprises placing the notification in a different area within a field of vision of the user.

7. The method of claim 4, wherein the notification is visual, and wherein increasing the prominence of the notification comprises prolonging a persistence of the notification within a field of vision of the user.

8. The method of claim 2, wherein the user customization includes specifying a period of time for blocking interruption notifications, and wherein notifying the user is based on whether the at least one interruption occurs during the specified period of time.

9. The method of claim 2, wherein the type of the at least one interruption is based on the source of the at least one interruption.

10. The method of claim 1, wherein monitoring for the interruptions comprises receiving signals sent by a network of smart home devices.

11. The method of claim 1, wherein the one or more sources include an individual nearby the user, and wherein detecting the at least one interruption includes detecting that the individual is making verbal statements.

12. The method of claim 11, wherein monitoring for the interruptions includes monitoring via one or more sensors for presence of one or more individuals within a predetermined proximity of the user or in physical contact with the user.

13. The method of claim 1, wherein execution of the predefined in-game reaction further includes saving a progress of the virtual reality game at a time when the at least one interruption is detected.

14. The method of claim 1, wherein the artificial intelligent control of the in-game character within the virtual reality game continues for the identified period of time during which the user is away from the virtual reality game.

15. The method of claim 1, wherein the identified period of time is based on the user pausing play of the virtual reality game on the virtual reality device.

16. The method of claim 1, wherein the artificial intelligent control starts automatically upon detecting the at least one interruption.

17. The method of claim 1, wherein the execution of the predefined in-game reaction includes searching for a replacement player to replace the user within the current game session of the virtual reality game.

18. The method of claim 17, wherein the search is performed during the identified period of time.

19. A system for incorporating in-game reactions within virtual reality games, the system comprising:
    a plurality of sensors that:
        monitor for interruptions from one or more sources external to the virtual reality game during a current game session during which a user is playing the virtual reality game on a virtual reality device; and detect at least one interruption to user game play within the current game session during which the user is playing the virtual reality game;

a game server communicatively connected to the virtual reality device via a communication network, wherein an on-going connection to the virtual reality device establishes the current game session;

a reaction module executable by a processor to:
  notify the user of the detected interruption;
  initiate a predefined in-game reaction within the current game session of the virtual reality game that corresponds to the detected interruption, wherein the predefined in-game reaction is executed for an identified period of time during which the user is away from the current game session of the virtual reality game responsive to the notification of the detected interruption, wherein execution of the predefined in-game reaction includes: initiating an artificial intelligent control of an in-game character based on a previously received user customization regarding the artificial intelligent control of the in-game character of the user in continuation of the current game session during the identified period of time; and
  allow the user to resume gameplay within the current game session of the virtual reality game, wherein the artificial intelligent control of the in-game character ceases when the user resumes gameplay after the identified period of time.

20. A non-transitory computer-readable storage medium having embodied thereon a program, the program being executable by a processor to perform a method for incorporating in-game reactions within virtual reality games, the method comprising:

establishing a current game session between a virtual reality device and a game server that hosts a virtual reality game, wherein establishing the current game session is based on communicatively connecting the virtual reality device to the game server via a communication network;

monitoring for interruptions from one or more sources external to the virtual reality game during the current game session which a user is playing the virtual reality game on the virtual reality device;

detecting at least one interruption to user gameplay within the current game session;

notifying the user of the detected interruption;

initiating a predefined in-game reaction within the current game session of the virtual reality game that corresponds to the detected interruption, wherein the predefined in-game reaction is executed for an identified period of time during which the user is away from the current game session of the virtual reality game responsive to the notification of the detected interruption, wherein execution of the predefined in-game reaction includes: initiating an artificial intelligent control of an in-game character based on a previously received user customization regarding the artificial intelligent control of the in-game character of the user in continuation of the current game session during the identified period of time; and allowing the user to resume gameplay within the current game session of the virtual reality game, wherein the artificial intelligent control of the in-game character ceases when the user resumes gameplay after the identified period of time.

* * * * *